March 27, 1928.
H. J. THEROUX
CALENDER GUIDE
Filed April 11, 1927
1,664,273
Fig. 1.
Fig. 2.
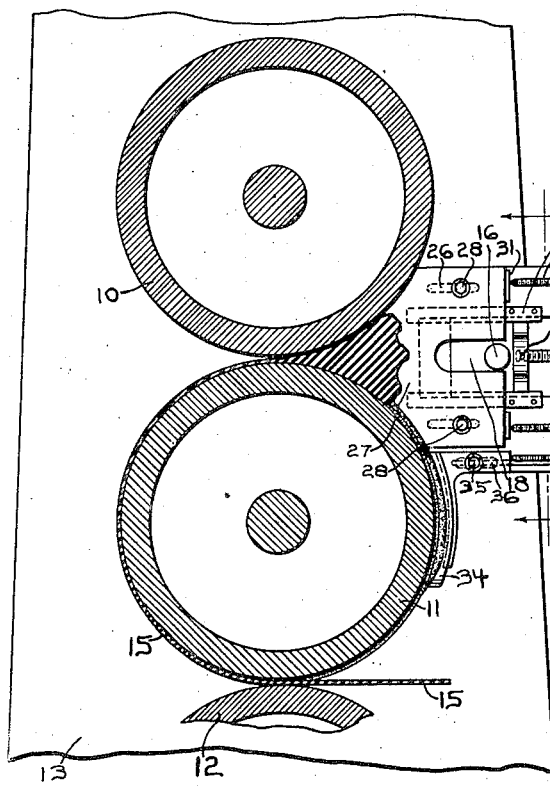
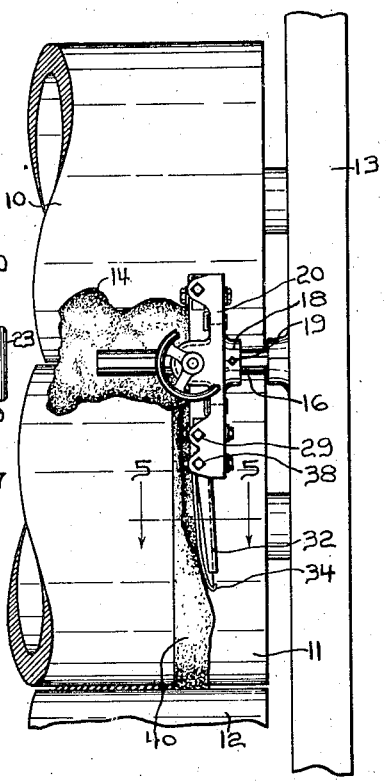
Fig. 3.
Fig. 4.
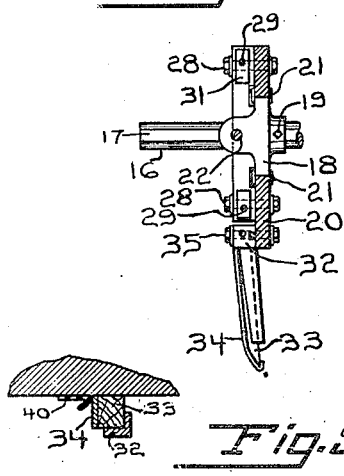
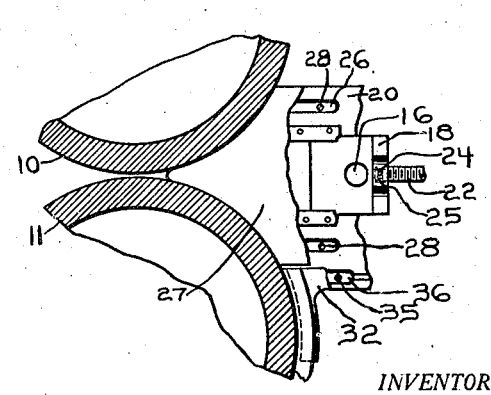
Fig. 5.
INVENTOR.
Hector J. Theroux
BY
Edward C. Taylor
ATTORNEY.

Patented Mar. 27, 1928.

1,664,273

UNITED STATES PATENT OFFICE.

HECTOR J. THEROUX, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

CALENDER GUIDE.

Application filed April 11, 1927. Serial No. 182,731.

This invention relates to a device for guiding the rubber feed between the rolls of a rubber sheeting or coating calender. It has for its object the improvement of guides of this character in providing for rapid replacement of worn out parts, permitting the accurate adjustment of the different components of the guide, and making possible the adjustment of the parts rapidly and without the use of tools.

Referring to the drawings,

Fig. 1 is a partial section through a standard form of calender to which my improved guide has been applied;

Fig. 2 is a side elevation of the parts shown in Fig. 1;

Fig. 3 is a section on line 3—3 of Fig. 1;

Fig. 4 is a section corresponding to Fig. 1, but with the rubber feed removed and parts of the guide broken away; and Fig. 5 is a section on line 5—5 of Fig. 2.

I have shown the device as applied to a calender of a conventional construction comprising rolls 10, 11, and 12, mounted in a frame 13. Suitable mechanism for driving the rolls is supplied in a standard manner which it is not necessary to illustrate. Between rolls 10 and 11 is placed the feed of rubber 14 which is sheeted out by the action of these rolls and by the action of rolls 11 and 12 into the sheet 15. In order to keep the feed 14 from overrunning at the ends of the rolls and to keep it within the width desired for the sheets to be manufactured, it is necessary to apply at each end of the feed a so-called calender guide. It is to the construction of this guide that my invention relates.

Mounted at each end of the calender frame 13 is a rotatable rod or post 16 having a flattened portion 17. A block 18 is secured to each rod by a set screw 19 acting upon the flattened portion of the rod. A frame 20 is guided upon the block by ways 21 so that it may be moved toward or from the calender roll. A screw 22 having a handwheel 23 is held against axial movement in the block by a pin 24 fitting into a groove 25 at one end of the screw. Intermediate its length this screw is threaded into the frame 20, so that by rotating the handwheel the frame may be moved toward or away from the calender roll.

Slots 26 in the frame provide for the mounting of a wedge-shaped block or guiding piece 27 which is shaped to conform to the curvature of the calender roll and extends almost to the line joining the centers of rolls 10 and 11. Bolts 28 passing through holes in the block and loosely through the slots 26 serve to hold the guiding piece 27 in any desired position of adjustment while permitting a slight relative free motion of the parts. In order to vary this adjustment screws 29 are threaded into the frame 20 and are held in adjusted position by lock nuts 30, the ends of the screws bearing against plates 31 secured to the outer face of the guiding piece 27.

Set below the guiding piece 27 is a bracket 32 bearing a wooden support 33 which in turn carries an aluminum shoe 34 shaped to the curvature of roll 11 and adapted to be pressed into close contact with it. As indicated in Fig. 2, this shoe is set at a slight angle in order to act as a plow and to turn back the marginal portion 40 of rubber which remains on the roll 11 after the sheet 15 has been trimmed to the desired width. This bracket is held to the frame by a bolt 35 passing through a hole in the bracket and loosely through a slot 36 in the frame. A screw 37 held by lock nut 38 to the frame 20 bears against the bracket in order to afford means of varying the adjustment of the shoe 34 relative to the roll 11, the shoe having a slight free motion because of the loose fit of bolt 35 in slot 36.

While the calender is in operation my improved guide functions in substantially the same manner as guides now in use. When it is desired to remove the guide temporarily either for cleaning the calender or for other purposes, the improvements which I have incorporated become apparent. If it is desired to back off the guide slightly for the sake of cleaning the calender the frame 20 can be moved away from the calender roll, carrying the guide piece 27 and the shoe 34 with it, by turning the handwheel 23. The adjustments of the guide piece and the shoe are not affected by this backing off, a very important distinction over prior devices. In some cases, also, it may be desirable to place guides on each side of the calender so that the latter can be run in either direction. The construction described lends itself perfectly to this arrangement, as the calender operator can back off the inactive guides by turning handwheels 23 without changing the relative adjustment of the piece 27 and the shoe 34.

If it is desired to change the facing on the shoe 34 the construction of my improved guide permits a ready removal of this shoe without disturbing the adjustment of the guide piece 27. Furthermore if it is desired to remove the guide entirely from the calender it is necessary only to back off the frame sufficiently to clear the calender roll, to loosen the set screw 19, and then to slide the block 18 together with the other parts supported by it off the end of the rod 16.

In changing the gauge of the stock being sheeted out by the calender the rolls 10 and 11 must be varied in their separation one from another. The slightly loose mounting of the block 27 and the shoe 34 by means of bolts 28 and 35 respectively, and the pivotal movement of the entire guide upon the calender frame through the post 17 permits the guides to seek a proper realignment when the handwheel 23 is turned up to press the parts against the rolls. In prior guides a change in the separation of the rolls necessitated a complete change in the independent adjustments of the guiding elements, whereas with my guide the necessary corrections take place almost automatically.

Having thus described my invention, I claim:

1. A calender guide having a block provided with ways, means for supporting the block in adjusted position adjacent the calender rolls, a frame movable in the ways towards and from the calender rolls, a guide piece shaped to fit between the calender rolls, means for holding the guide piece in adjusted position on the frame, a shoe shaped to bear against one of the calender rolls, means for holding the shoe in adjusted position on the frame independently of the guide piece, and means for holding the frame in adjusted position in the ways without disturbing the adjustment of the guide piece and shoe on the frame.

2. A calender guide comprising a frame adjustable towards and away from the calender rolls, a guide piece shaped to fit between the calender rolls and adjustably mounted on the frame, and a shoe shaped to bear against one of the calender rolls and adjustably mounted in the frame independently of the guide piece.

3. A calender guide comprising a pivoted frame adjustable towards and away from the calender rolls; a guide piece shaped to fit between the calender rolls, adjustably mounted on the frame, and having a slight free movement thereon; and a shoe shaped to bear against one of the calender rolls, adjustably mounted in the frame independently of the guide piece, and having a slight free movement with respect to the frame.

HECTOR J. THEROUX.